United States Patent [19]

Anderson et al.

[11] 4,249,642
[45] Feb. 10, 1981

[54] OXIDATION INHIBITING CAP FOR A CARBON FRICTION DISC

[75] Inventors: Bruce W. Anderson, Niles, Mich.; Gregory M. Jessup; Robert B. Preniczny, both of South Bend, Ind.

[73] Assignee: The Bendix Corporation, Southfield, Mich.

[21] Appl. No.: 958,213

[22] Filed: Nov. 6, 1978

[51] Int. Cl.² .............................................. F16D 65/12
[52] U.S. Cl. ............................. 188/73.2; 188/218 XL
[58] Field of Search ............. 188/71.5, 73.2, 218 XL, 188/250 B, 251 A; 192/70.19, 70.2, 107 M

[56] References Cited

U.S. PATENT DOCUMENTS

| 3,757,907 | 9/1973 | Crossman et al. | 188/73.2 X |
| 4,083,434 | 4/1978 | Pinter | 188/73.2 |

*Primary Examiner*—Duane A. Reger
*Attorney, Agent, or Firm*—Leo H. McCormick, Jr.; Ken C. Decker

[57] ABSTRACT

A series of cap members for covering the drive splines of a plurality of carbon friction discs in a wheel and brake assembly to protect the carbon from oxidization. Each of the cap members have first and second tabs that project into the root sections on the carbon disc between the drive splines. The first tabs on the series of cap members are connected to adjacent second tabs to form a continuous ring member which protects the carbon friction disc from degradation caused by oxidation. During a brake application, the carbon friction disc adjacent the cap member engage a portion of the cap member. Thereafter, the cap member and/or the adjacent carbon friction disc are worn away to maintain the oxidation protection after repeated brake applications.

10 Claims, 7 Drawing Figures

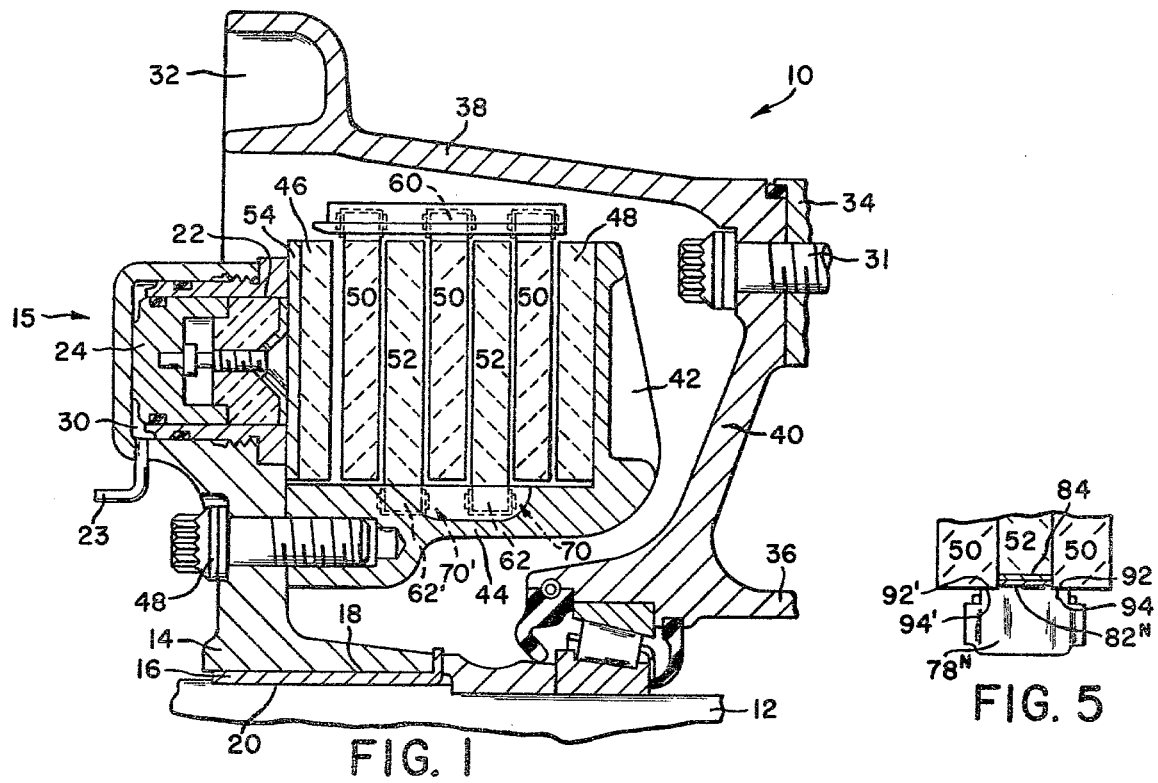
FIG. 1
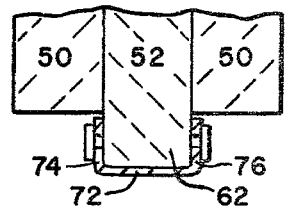
FIG. 5
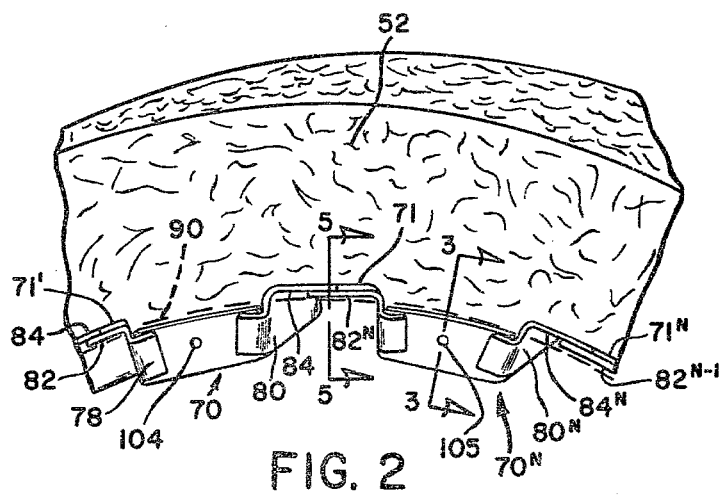
FIG. 2
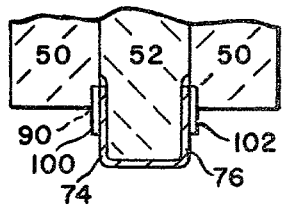
FIG. 3
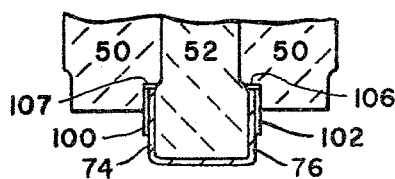
FIG. 6
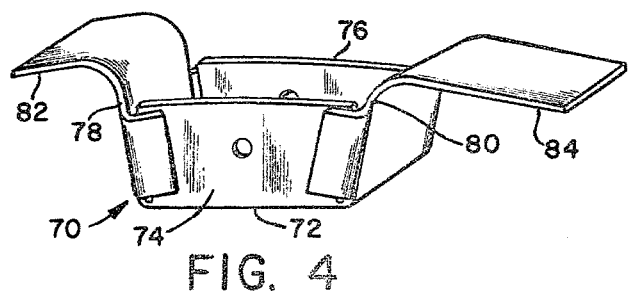
FIG. 4
FIG. 7

OXIDATION INHIBITING CAP FOR A CARBON FRICTION DISC

BACKGROUND OF THE INVENTION

The use of carbon discs as a friction element in aircraft wheel and brake assemblies have gained acceptance as a way of increasing the payload of an aircraft by reducing the weight of braking systems.

In U.S. Pat. No. 3,639,197, it is disclosed how a continuous carbon fiber can provide a carbon disc with the structural unity needed to absorb repeated braking torque. Such carbon friction disc when used in aircraft braking systems often experience thermal conditions above 800° F. Above 800° F. the non-swept areas of carbon friction disc are subject to accelerated oxidation which can lead to a disintegration of the carbon matrix and continuous carbon fiber resulting in a brake element failure.

In U.S. Pat. No. 3,914,508 a method is disclosed for protecting a carbon substrate in a moist environment from oxidation by coating a selected surface thereof with a boron and metallic mixture attached thereto by a resin matrix. As with most coatings, it is difficult to maintain a uniform thickness over the entire peripheral surface. As a result where the coating is limited or absent, deterioration of the carbon substrate often takes place after repeated applications.

In a further attempt to protect a carbon friction material, a metal ring as disclosed in U.S. Pat. No. 3,473,637, was placed on the outer periphery of a carbon disc to prevent oxidation of the non-swept area. During frictional operation when the thermal energy produced is low, such protection is effective. However, as the thermal energy generated during braking increases, the unity of the carbon material and steel ring change in a direct proportion to the differences in their thermal coefficients of expansion. After a repeated number of frictional engagements at high temperatures, structural defects can occur along the periphery of the carbon material because of different coefficients of expansion. Thereafter, oxygen in the surrounding air can enter and degrade the underlying carbon friction disc.

U.S. Pat. No. 3,972,395 discloses a protection member which matches the coefficient of thermal expansion of the carbon friction disc. The protection member, which includes a woven carbon sheath and a protecting screen, is bonded to the peripheral non-swept surface to protect the underlying carbon friction disc. In order to protect the driving slots on the rotor member, a reinforcing plate is attached to the peripheral surface by a driving pin that extends through the carbon friction disc. Unfortunately, the driving pins are located in a high stress area and under some extreme conditions a structural failure may occur in the area of the driving pins.

SUMMARY OF THE INVENTION

We have discovered a protection system for a carbon friction disc of a wheel and brake system whereby a series of cap members surround a corresponding series of driving splines to protect the underlying carbon material from degradation through oxidation. Each of the cap members has a portion thereof that extends into swept areas of the carbon friction disc, and first and second tabs that project into the root sections between the driving splines. The first tab on a cap is fixed to a second tab on an adjacent cap to hold the caps tight against the splines and thereby establish a continuous ring of protection against oxidation for the carbon friction disc. During a brake application, the carbon friction disc adjacent the series of cap members engage a portion of each cap member and provide a positive seal from an oxidation atmosphere for the non-swept portion of the carbon friction disc. As the carbon friction discs wear, either that portion of the cap members in the swept area or the adjacent carbon friction discs wear to maintain the positive seal of protection after repeated brake applications.

It is an object of this invention to provide a carbon friction disc in a wheel and brake system with a series of cap members to protect the driving splines and root sections from oxidation during a brake application.

It is another object of this invention to provide a carbon friction disc with a series of metal cap members for surrounding a corresponding series of driving splines.

It is a further object of this invention to provide a relatively flexible metallic member for protecting a peripheral surface of a carbon friction disc and thereby reduce the possibility of degradation thereof in an oxidizing atmosphere.

These and other objects should be apparent from reading this specification and viewing the drawings.

BRIEF DESCRIPTION OF THE DRAWINGS

FIG. 1 is a sectional view of an aircraft wheel and brake assembly having a plurality carbon friction disc with protection caps made according to this invention to reduce degradation of the carbon friction disc when exposed to an oxidizing atmosphere;

FIG. 2 is a perspective view of a segment of the carbon friction disc of FIG. 1 having protection caps located on the driving splines;

FIG. 3 is a sectional view taken along line 3—3 of FIG. 2;

FIG. 4 is a perspective view of a single protection cap;

FIG. 5 is a sectional view of a segment of a carbon friction disc taken along lines 5—5 of FIG. 2 showing the relationships of a protection cap and the peripheral surface of adjacent carbon friction discs after repeated brake applications;

FIG. 6 is a sectional view of a segment of a carbon disc having a protection cap with an abrasive surface engaged with the peripheral surface of adjacent carbon friction discs; and FIG. 7 is a sectional view of the carbon friction disc of FIG. 6 after a predetermined number of brake applications.

DETAILED DESCRIPTION OF THE INVENTION

The wheel and brake assembly shown in FIG. 1 includes a wheel 10, only partially shown that is rotatably mounted on a stationary axle 12 and a brake 15 that is mounted on a stationary carrier member 14 fixed to the axle 11 by locating pin 16 in slots 18 and 20. Since the structure for rotatably mounting wheel 10 to axle 12 and fixing the stationary carrier member 14 to the axle 12 is well known, further description thereof is not deemed to be necessary.

The wheel 10 has a first section 32 that includes a hub 36 and a rim 38 interconnected to each other by a plurality of spokes 40 and a second section 34. The first and second sections 32 and 34 are joined together by a plurality of bolts 31 after a tire is mounted on the wheel 10.

The carrier member 14 contains a plurality of fluid motors 15 (only one is shown in FIG. 1) which are connected to a fluid pressure source through conduit 23.

Each fluid motor 15 has a piston 24 located in a bore 22 that moves a pressure plate 46 toward a backing plate 48 in response to a brake actuation signal in the form of an increase in fluid pressure transmitted through conduit 23 to actuation chamber 30. The backing plate 48 is connected to a flange 42 which radially projects from sleeve 44 which is secured to the carrier member 14 by a plurality of circumferentially spaced bolts 48.

The disc brake illustrated in FIG. 1 includes a plurality of interleaved rotors 50, which are splined to and are rotated by the aircraft wheel 10 and a plurality of stators 52, which are splined to sleeve 44 of the torque tube. Both the rotors and stators are movable axially by piston 24 and are sometimes referred to as a brake "stack".

The pressure plate 46, which is attached to piston 24 of the fluid motor 16 has a carbon friction pad which acts on and forces the rotors 50 and stators 52 against each other and the entire stack against a carbon friction pad on the backing plate 48. It is the frictional engagement of the rotatable rotors 50 with the stationary stators 52 which produces the braking action of the aircraft wheel.

During a brake application, the temperature generated by the frictional engagement of the swept sections, illustrated by dashed line 90 in FIG. 2, of the carbon friction rotors and stators can often reach 500° C. This temperature which is carried into the non-swept sections, such as the driving splines 60, 60', 60", and 62, 62', and root sections 71, 71' . . . $71^n$ separating the splines, could cause the carbon to combine with oxygen in the air of the surrounding environment and degrade the driving splines. However, a series of cap members 70, 71' . . . $70^n$, as best shown in FIGS. 2 and 4 form a continuous ring of protection for the splines 62 and root section 71 to restrict oxygen from directly contacting the carbon friction rotors and stators 52.

Each of the cap members 70 as shown in FIGS. 2, 3 and 4 has a base 72 with parallel side walls 74 and 76 and first and second legs 78 and 80 which extend therefrom. A first tab 82 projects from the first leg 78 and a second tab 84 projects from the second leg 80. The first tab 82 of a first metal cap member 70 is aligned with a second tabl 84' of a second cap member 70' and secured together through spot or projection welds. Thereafter, the first tab 84' of cap member 70' is aligned and welded to the second tab 84" of a metal cap member 70". This alignment and welding continues until metal cap member $70^n$ is reached with only the second tab 84 and the first tab $82^n$ remaining unattached to each other. Thereafter, base 72 on the first metal cap member 70 is positioned on the top of a spline 62 with tab 84 on leg 80 flush with root section 71. The remaining metal cap members 70' . . . $70^n$ are positioned on splines 62' . . . $62^n$ until the first tab $82^n$ is aligned with the second tab 84 on cap member 70. As shown in FIG. 2, tab $82^n$ laps over the end of tab 84. Thereafter, tabs 84 and $82^n$ can be connected together by a single spot weld to establish a continuous ring. However, it may be preferable to connect metal cap members 70 and $70^n$ to the carbon disc through pins 104 and 105 which extend through the center of side walls 74 and 76, and the splines 62 and side walls $74^n$ and $76^n$ and splines $62^n$. By locating the pins 104 and 105 in the center of splines 62 and $62^n$, any expansion changes in the metal cap members 70 and $70^n$ with respect to splines 62 and $62^n$ should not introduce any additional stresses on either the metal caps 70, 70' . . . $70^n$ or the splines 62, 62' . . . $62^n$ since the side wall 74, 74' . . . $74^n$ and 76, 76' . . . $76^n$ should expand equally around the pins 104 and 105. Thus, even though tabs 84 and $82^n$ are not welded together, a substantially continuous ring of protection from direct exposure to the oxygen in the air is provided.

MODE OF OPERATION OF THE INVENTION

When the tire on wheel 10 engages the ground and the aircraft is moving, wheel 10 rotates. Since rotors 50 are connected to wheel 10, they also rotate while stators 52 remain stationary with respect to axle 12. To effect a brake application, a pilot activates a fluid pressure source (not shown) which is communicated through conduit 23 to piston 24. This fluid pressure acts on piston 24 and provides an axial force which moves pressure plate 54 toward backing plate 46 to bring the rotors 50 and stators 52 into frictional engagement. This frictional engagement generates thermal energy in the carbon disc of each of the rotors 50 and stators 52.

The swept section of stators 52, illustrated by line 90 in FIG. 2, is protected from oxidation caused by oxygen in the presence of high thermal energy through the engagement of the adjacent rotor 50. That portion of the splines 62 and root section 71 in the swept section are protected by legs 78 and 80 and tabs 82 and 84 of the cap members that extend into the swept section of the brake assembly.

Similarly, the splines of the rotors 50 are also protected by cap member 70. After a repeated number of brake applications, the rotors and stators wear, however, as shown in FIG. 5, the oxidation protection ring for that portion of the splines 62 outside of the swept section remains since the carbon material on the adjacent rotors engage legs 78 and 80 and tabs 82 and 84 to wear away a portion of the protection ring at a rate corresponding to the wear rate of adjacent rotor and stator carbon friction discs. As shown in FIG. 5, peripheral surface 92 and 92' on rotors 50 and 50' establish an effective sealing surface with surfaces 94 and 94' on splines 62 to maintain the structural unity of the carbon friction discs.

For some applications it may be desirable that parallel side walls 74 and 76 of the cap members 70 extend into the swept section of the brake. In order to prevent the adjacent carbon rotors 50 and 50' from wearing the side walls 74 and 76, a protective abrasive coating such as aluminum oxide, silicon carbide, industrial diamond, etc., is applied to selected portions 100 and 102 of side walls 74 and 76, as shown in FIG. 6. Thereafter, as the carbon rotors and stators wear, the abrasive surfaces 100 and 102 engage an arcuate segment of peripheral surface 107 and 106, see FIG. 7, on the adjacent carbon disc to maintain the air restrictive seal for the continuous ring of protection.

It has been determined that the temperature at the interface between the swept section and the non-swept section of each carbon friction disc can often reach 400° C. Even though the carbon friction disc and the protective metal cap members 70, 70' . . . $70^n$ have different coefficients of expansion, the carbon splines 62, 62' . . . $62^n$ are not damaged since the side walls 74 and 76 can move independently of legs 78 and 80. That portion of the legs 78 and 80 and the tabs 82 and 84 which are located in the swept section of the friction disc are subjected to the maximum thermal energy generated during a brake application. As shown in FIG. 2, a certain amount of clearance is present between the first tabs 82, $82^n$ and the root sections 71, 71'...$71^n$. The thickness of the first tabs 82, $82^n$ is such that this clearance allows the protective ring to expand without damaging the carbon splines 62, 62'...$62^n$ or the protective ring whenever the temperature is sufficient to expand the metal cap members 70, $70^n$.

After repeated brake applications, the carbon disc in the rotors and stators are worn and must be replaced in order to have adequate braking since the stroke of piston 24 is limited to a fixed distance. When this stroke limit is reached, the rotors and stators are removed from the brake. However, the metal cap members as shown in FIG. 6 are salvageable since the abrasive coating wears the carbon disc rather than the metal being worn away. Thereafter, the first pin 104 and a second pin 105 are removed from the center of the side walls 74 and 76 on adjacent metal caps 70 and $70^n$.

When pins 104 and 105 are removed, the flexibility of the protective ring through the welded connections between the tabs $82^n$ and $84^n$ of the remaining metal cap members 70 is such that the caps are easily removed from the splines of the worn carbon disc and replaced on a new carbon friction disc by pins 104 and 105.

We claim:

1. In a wheel and brake assembly having a key-slot coupling through which a braking torque is transmitted during engagement of a plurality of carbon friction discs to effect a brake application, each of said carbon friction discs having a series of splines that extend from a swept section to a non-swept section, each spline in said series of splines being separated from each other by a root section, said non-swept section and each root section being subjected to an oxidizing environment that could structurally degrade said carbon friction disc, the improvement comprising:

a series of caps surrounding that portion of series of splines in the non-swept section of said carbon friction disc, each cap in said series of caps having first and second tabs extending into root sections on opposite sides of each spline, said first tab on each cap and a second tab on an adjacent cap being attached to each other to establish a continuous ring of protection to prevent said carbon friction disc from being directly exposed to said oxidizing environment, said first and second tabs on each cap of said series of caps extend into said swept section of said cap friction disc, said first and second tabs and carbon friction discs in said swept section being worn through the engagement with adjacent carbon friction discs to assure that said series of splines remain protected from the oxidizing environment after repeated brake applications.

2. In the wheel and brake assembly, as recited in claim 1 wherein that portion of the series of caps that extend into said swept section of said carbon friction discs each have an abrasive surface thereon which engage an adjacent carbon friction disc, said abrasive surface wearing said adjacent carbon friction disc to prevent structural damage to said series of caps after repeated brake applications.

3. In the wheel and brake assembly, as recited in claim 1, further including:
    pins extending through a selected member of said series of caps to positively retain each of said caps against the non-swept section of said carbon friction discs.

4. In a wheel and brake assembly having a key slot coupling through which a plurality of carbon friction discs are moved toward each other during a brake application by an actuator to develop a braking torque, each of said carbon friction discs having a series of splines separated by root sections, said splines and root sections being protected by cover means to reduce degradation of the carbon friction discs by an oxidizing atmosphere, the improvement wherein said cover means extend into said root sections and engage adjacent carbon friction discs on each brake application to maintain said protection after repeated brake applications.

5. In the wheel and brake assembly, as recited in claim 4 wherein said cover means includes:
    a series of cap members that surround said splines, each cap in said series of cap members having a first tab and a second tab that projects into said root sections, a first tab in a cap member and a second tab on an adjacent cap being fixed to each other to establish a continuous ring of protection for both the splines and root sections of said carbon friction disc.

6. In the wheel and brake assembly, as recited in claim 5 wherein each of said cap members include:
    first and second abrasive surfaces for engaging adjacent carbon friction discs to prevent said adjacent carbon friction discs from wearing away said cap members and thereby exposing said carbon friction discs to the oxidizing atmosphere.

7. In the wheel and brake assembly, as recited in claim 5 wherein a portion of each of said cap members is progressively worn by repeated engagements with said adjacent carbon friction discs to restrict the communication of air between the peripheral surfaces of the adjacent carbon friction discs and said splines.

8. In the wheel and brake assembly as recited in claim 7 further including:
    a plurality of pins extending through a portion of a selected number said cap members to retain said cap members against said carbon friction discs after a repeated number of brake applications.

9. In the wheel and brake assembly, as recited in claim 5 wherein said cap members are only attached to each other through the first and second tabs on adjacent caps.

10. In the wheel and brake assembly as recited in claim 9 wherein said first and second tabs can expand within said root section without damaging the splines.

* * * * *